United States Patent
Wilson

[19]

[11] Patent Number: 5,813,717
[45] Date of Patent: Sep. 29, 1998

[54] CABLE OPERATED DUAL SYNCHRONOUS OPENING MIRROR DOORS FOR SUN VISORS

[75] Inventor: Douglas J. Wilson, Ft. Gratiot, Mich.

[73] Assignee: Automotive Industries, Inc., Rochester Hills, Mich.

[21] Appl. No.: 914,460

[22] Filed: Aug. 19, 1997

Related U.S. Application Data

[63] Continuation of Ser. No. 648,654, May 15, 1996.

[51] Int. Cl.$^6$ ....................................................... B60J 3/00
[52] U.S. Cl. ................................................................ 296/97.5
[58] Field of Search ............................... 296/97.5; 49/123

[56] References Cited

U.S. PATENT DOCUMENTS

| | | | |
|---|---|---|---|
| 1,198,896 | 9/1916 | Davis | 49/123 |
| 4,050,191 | 9/1977 | Azuma | 49/123 |
| 5,301,994 | 4/1994 | Wilson | 296/97.5 |

*Primary Examiner*—Gary C. Hoge
*Attorney, Agent, or Firm*—Brooks & Kushman P.C.

[57] ABSTRACT

A hollow visor is provided which is adapted to receive a mirror and define a track having a pair of split pulley portions forming a pathway. A plurality of doors are provided which are located within the visor and which are movable within the track for selectively moving between an extended position which covers the mirror and a retracted position which uncovers the mirror. A continuous flexible tape extends around the pathway and around the mirror but in concealably spaced relationship with the track so that the flexible tape and the track are concealed from the user's view during operation of the doors. The tape attaches respectively to each of the two mirror doors at locations 180° apart. The tape extends around the pathway and the split pulley portions on opposite sides of the mirror while interconnecting the two doors such that when one door is moved in one direction, the other door moves synchronously in the opposite direction and through the same distance.

10 Claims, 2 Drawing Sheets

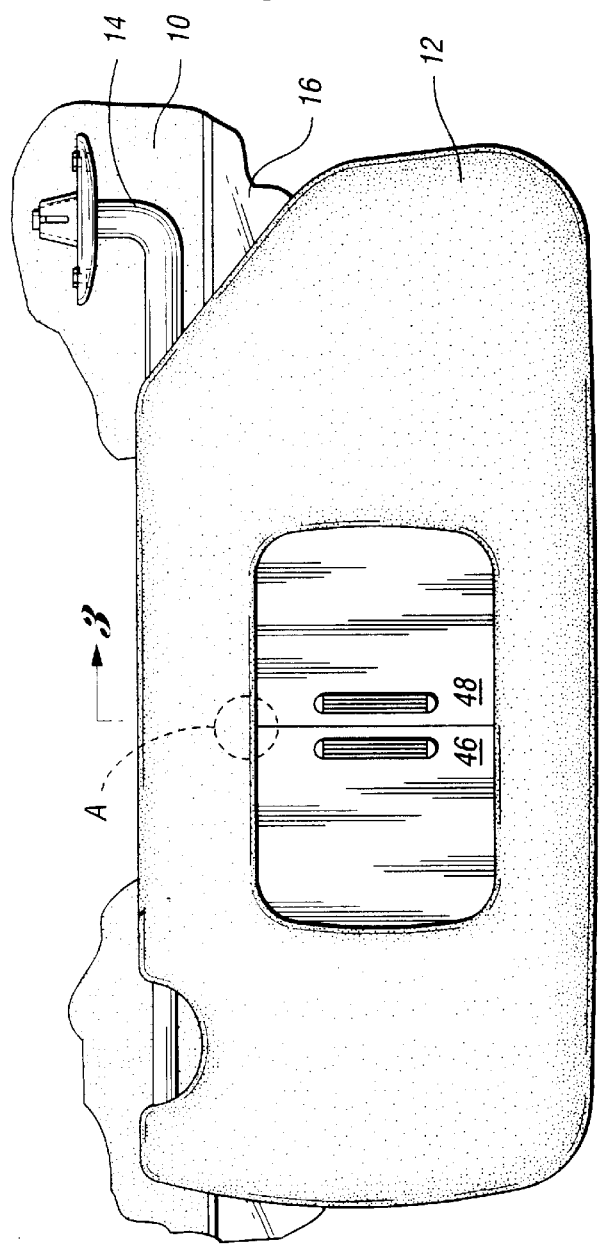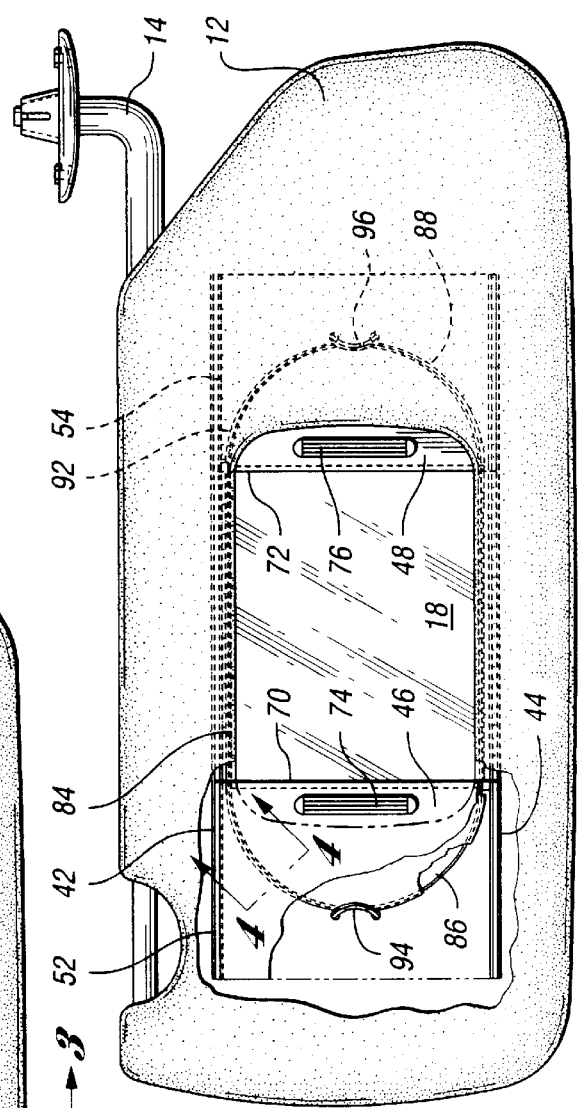

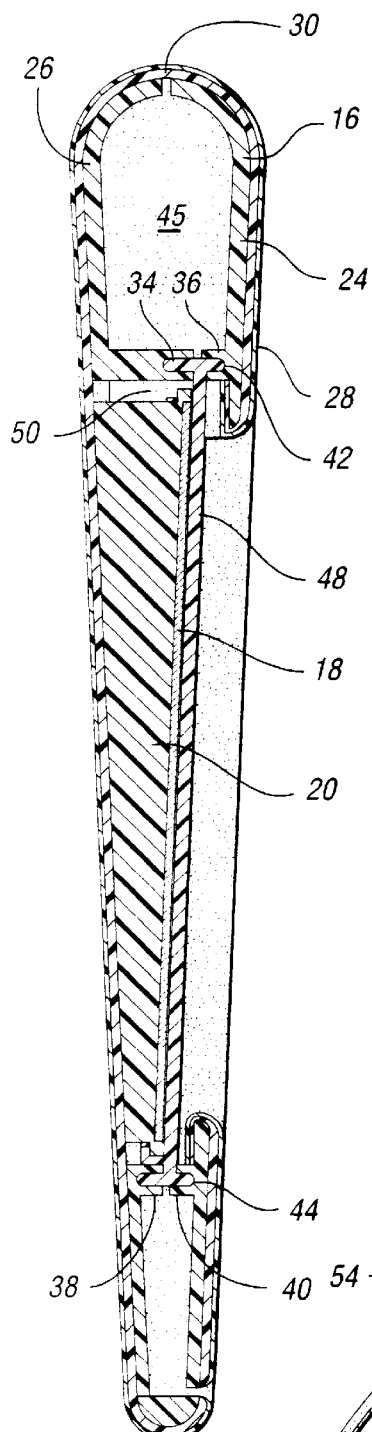
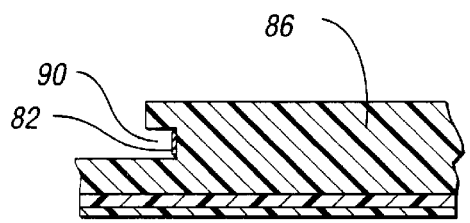
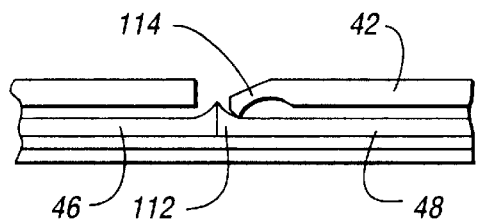
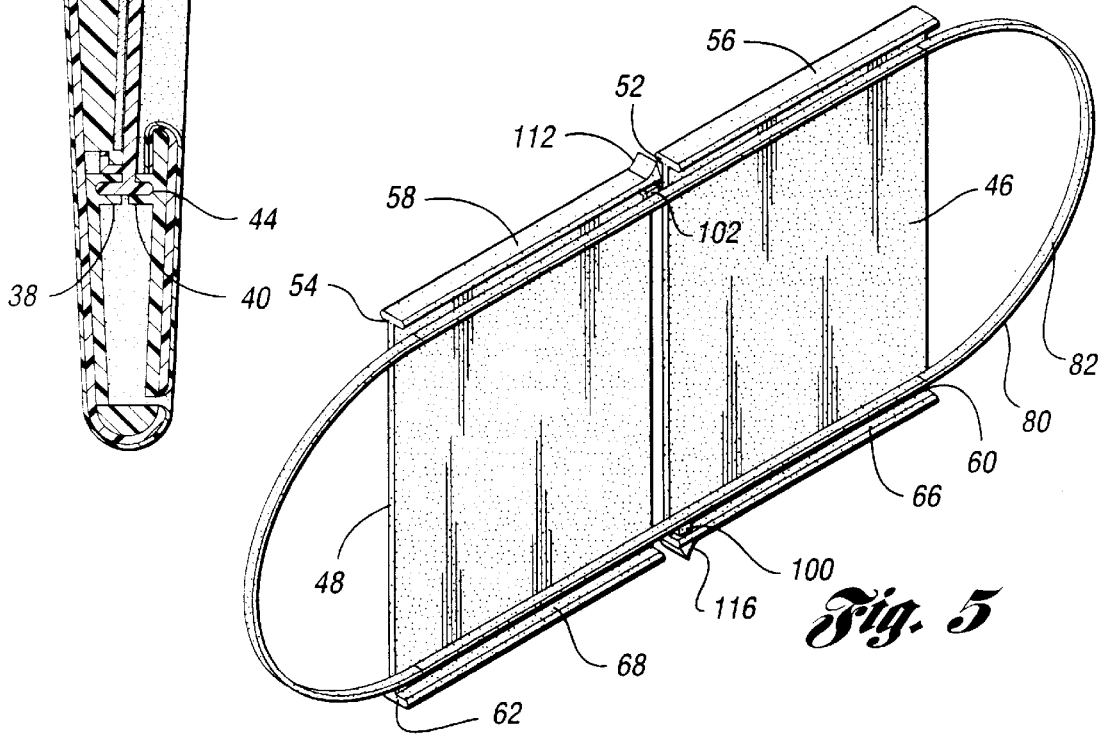

CABLE OPERATED DUAL SYNCHRONOUS OPENING MIRROR DOORS FOR SUN VISORS

This is a continuation of copending application Ser. No. 08/648,654 filed on May 15, 1996.

CROSS-REFERENCE TO RELATED APPLICATIONS

A related application is the reissue of U.S. Pat. No. 5,301,994 which is Ser. No. 08/627,021.

TECHNICAL FIELD

The technical field is mirror visors for vehicles.

BACKGROUND ART

My earlier U.S. Pat. No. 5,301,994 issued Apr. 12, 1994, discloses a hollow visor arrangement provided with a channel or track and a mirror therein. A pair of doors are located within the visor which are movable within the channel for selectively moving between an extended position which covers the mirror and a retracted position which uncovers the mirror. In this embodiment of a dual synchronous opening mirror door, either a lever mechanism or a rack and pinion mechanism is operable for interconnecting the pair of doors for simultaneous movement thereof between the extended position and the retracted position when either one of the pair of doors is moved. These arrangement use rigid parts and multiple components to interconnect the doors— arrangements which are less compact, more costly and more difficult to conceal the interconnecting mechanisms from the user of the visor mirror than the flexible cable arrangement of this invention.

Flexible means have been used in window regulator mechanisms for automotive vehicles. For instance, U.S. Pat. No. 3,702,041 issued Nov. 7, 1972 discloses a rotary input type window regulator adapted to move a vehicle mounted window between open and closed positions with a pivotable operating handle. The regulator uses a flexible tape-like drive member connected to a lift arm and the window. A similar automotive window regulator mechanism is disclosed in U.S. Pat. No. 4,004,371 issued Jan. 25, 1977. The regulator mechanism of the '371 patent includes a track having two substantially vertical track sections and an interconnecting laterally extending section, a perforated plastic tape slidably mounted in the track, an actuator including a clutch, and a sprocket for driving the perforated tape along the track, and a bracket arrangement secured to a windowpane along the bottom edge thereof and connecting same to an end of the perforated tape for travel therewith up or down adjacent one of the two vertical track sections.

A steel band and hub gear stamped from sheet metal is used as a window raising device in U.S. Pat. No. 1,627,697 issued May 10, 1927. A similar flexible coilable tongue member composed of spring metal is connected to a window in a window regulator device of U.S. Pat. No. 3,035,829 issued May 22, 1962.

An endless or continuous chain has also been used in window lifting mechanism when the chain is actuated by a chain wheel rotatable by means of a handle, see British Patent 274,645 published in 1927.

The present invention incorporates many of the known benefits of providing dual synchronous or bi-parting doors for uncovering a visor mirror while improving the compactness and cost of the visor mirror assembly.

SUMMARY OF THE INVENTION

This invention relates to a vanity visor mirror for use in a vehicle. The vanity mirror is formed as a visor mirror assembly which has a hollow shell of molded clamshell like configuration which, when folded open, includes housing structure within the hollow for supporting a mirror, a track adjacent the mirror and a pair of split pulley portions which are spaced from each other and sufficiently outboard of the mirror that when the split pulley portions are aligned they define a pathway around the mirror.

A pair of opposed doors are slidably mounted to the housing when the clamshell is closed for operable movement in the track toward one another between a substantially abutting closed position for covering the mirror and away from one another toward an open position which exposes the mirror for use by the occupants of the vehicle. The mirror doors may be rectangular in shape and one of the doors has a first side edge adjacent the pathway on one side of the mirror, while the other of the doors has a second side edge adjacent the pathway on the opposite side of the mirror.

A continuous flexible tape or cable extends around the pathway and around the mirror but in concealably spaced relationship with the track so that the flexible cable and the track are concealed from the user's view during operation of the doors. The belt-like or string-like cable forms a continuous loop of material which attaches respectively to each of the two mirror doors at locations 180° apart. The cable thus extends around the pathway and the split pulley portions on opposite sides of the mirror while interconnecting the two doors such that when one door is moved in one direction, the other door moves synchronously in the opposite direction and through the same distance.

Accordingly, it is an object of the present invention to provide an improved mechanism for selectively covering and uncovering visor mirror.

Another object of the invention is to provide an improved mechanism for effecting simultaneous movement of a pair of doors in opposed directions when selectively covering and uncovering a visor mirror.

A further object of the invention is to provide simultaneous movement of a pair of doors in opposed directions for selectively covering and uncovering a visor mirror with an improved assembly which includes a continuous flexible loop of a belt like material extending around the mirror and selectively affixed to a respective door of the pair on opposite sides of the mirror.

A more specific object of the continuous flexible loop in the last object is to provide the loop with a string-like configuration which is so small with respect to the size of the mirror doors that the loop is easily concealed from the view of the user of the mirror.

A still more specific object of this invention is a visor mirror assembly for a vehicle which comprises a hollow shell having a mirror which is supported by a housing within the shell. The housing has a track adjacent the mirror and a pair of split pulley portions sufficiently outboard of the mirror and aligned to as to define a pathway around the mirror. A pair of opposed doors are slidably mounted to the housing for movement in the track toward one another between a substantially abutting closed position for covering the mirror and away from one another toward an open position which exposes the mirror for use. One of the doors has a first side adjacent the pathway on one side of the mirror, while the other of the doors has a second side adjacent the pathway on the opposite side of the mirror. A continuous flexible loop extends around the pathway and around the mirror in concealably spaced relationship with the track. The loop is fixed at one point with respect to one side of one of the doors and is fixed at another point with respect to the other door on the other side of the mirror. The affixation of the loop to the doors intercouples the doors such that movement of one door synchronously moves the other door in an opposite direction and through the same distance.

The above objects and other objects, features and advantages of the present invention are readily apparent from the following details description of the best mode for carrying out the invention when taken in connection with the accompanying drawings.

BRIEF DESCRIPTION OF THE DRAWINGS

FIG. 1 is a fragmentary front elevational view of a vanity visor embodying the present invention mounted to a vehicle and shown with the bi-parting mirror doors in a first or doors closed position;

FIG. 2 is a fragmentary front elevational view of the vanity visor shown in FIG. 1 shown with the bi-parting mirror doors moved to a second doors open position and with parts broken away to show the flexible cable door operating mechanism;

FIG. 3 is a cross-sectional view partly in elevation taken along lines 3—3 in FIG. 1;

FIG. 4 is a fragmentary sectional view of the flexible cable mechanism for driving and interconnecting the mirror doors and taken along line 4—4 in FIG. 2;

FIG. 5 is a perspective view of another embodiment of the present invention showing the bi-parting doors and interconnecting cable molded as a single unit; and FIG. 6 is a fragmentary side elevational view enlarging a detail A in FIG. 1 to show a door biasing arrangement suitable for assuring that the pair of doors will be completely closed in the closed position.

DETAILED DESCRIPTION OF THE PREFERRED EMBODIMENTS

FIG. 1 shows the interior of a vehicle 10 such as an automobile having as a feature thereof an improved vanity mirror assembly or blade 12 featuring the improved intercoupling mechanism of this invention. The visor blade includes an elbow mounting bracket 14 of conventional design for mounting the visor to the roof of the vehicle above the vehicle windshield 16. The visor blade is pivotable about the pivot mounting bracket between a raised stored position adjacent the vehicle roof, or a lowered use position shown in FIGS. 1 and 2 covering the upper portion of the vehicle windshield. The visor mirror assembly 12 is connected as a unit to the pivot mounting bracket 14.

With reference to FIG. 3, the visor assembly includes a hollow shell 16 which has a mirror 18 supported by a housing, pedestal or other internal structure 20 within the shell. The shell can be a molded plastic body of clamshell design having hinged front 24 and rear 26 housing portions covered by a suitable upholstery fabric or vinyl 28 compatible with the interior of the vehicle on which the mirror visor is mounted.

The front 24 of the clamshell 16 may pivot with respect to the rear 26 about a living hinge 30. When the shell is open parts of the visor mirror assembly may be installed. When the clamshell is closed, the interior housing of the hollow plastic core includes the pedestal or housing portion 20 for mounting the mirror 18. The interior housing also includes as a part of the hollow shell a pair of door tracks 34, 36 on one side of the mirror 18 and another pair of door tracks 38, 40 on the opposite side of the mirror. When the clamshell 16 is closed, the pair of tracks 34, 36 on one side as well as the pair of tracks 38, 40 on the opposite side of the mirror mate to provide a single track 42, 44 respectively on each side of the mirror. The tracks slidably mount the mirror doors 46, 48 for movement to cover and uncover the mirror 18 behind the doors.

Thus, the hollow shell or hollow plastic core 16 when in the closed clamshell position define a pair of channels or tracks 42, 44 which are located within the hollow 45 of the shell so that the mirror can be selectively covered and uncovered by the pair of doors 46, 48 without seeing the means 50 which slidably move the doors. The pair of doors in this embodiment includes the first door 46 and a second door 48 mounted within the track 42 above the doors and the track 44 below the doors. The first door 46 and the second door 48 are confined by the tracks so as to control their travel between a retracted doors-open position substantially within the hollow of the shell to uncover the mirror and an extended doors-closed position substantially outside the shell to cover the mirror.

As shown in FIG. 1, the first door 46 and the second door 48 are in opposed relation to each other. Specifically, the first door and the second door travel in opposite directions when moving between the retracted doors-open position and the extended doors-abutting position. It is also possible to utilize a plurality of doors having an accordion type connection so as to alternatively fold or unfold relative to one another while travelling in opposed relation to selectively cover and uncover the mirror in accordance with the present invention. It is also possible to have both doors or one of the doors cooperate with an illumination device to illuminate the mirror when the doors are in or move toward a retracted position.

The means 50 to slidably move the doors 46, 48 is a cable operating mechanism 50 which will now be described.

Referring now to FIG. 2 the visor mirror assembly 12 includes upper track 42 and lower track 44 within the hollow shell 16. Mirror 18 is supported within the housing between the tracks and closely adjacent to the tracks.

The pair of opposed doors 46, 48 are slidably mounted to the housing within the tracks. Each of the upper edge 52 of door 46 and the upper edge 54 of door 48 has a transverse flange 56, 58 respectively (FIG. 3) which are sandwiched between track portions 34 and 36 when the clamshell 16 is closed. Each of the lower edge 60 of door 46 and the lower edge 62 of door 48 has a transverse flange 66, 68 respectively which are sandwiched between track portions 38, 40 when the clam shell 16 is closed. Door 46 has a leading edge 70 which abuts a leading edge 72 of door 48 when the doors close to cover the mirror. Decorative ribs 74, 76 on respective doors provide grip or handle portions for moving the doors. Either grip portion will move both doors synchronously between their open and closed positions by an intercoupling means 80 which will now be described.

With reference to FIGS. 4 and 5, the improved intercoupling means 80 of this invention is comprised of a continuous flexible means 82 which may be a cable loop having the characteristic of tape or string. The cable loop slides in a pathway 84. The pathway or track 84 is defined by a pair of split pulley portions 86, 88 outboard or on opposite sides of mirror 18. Pulley portion 86 has a groove, sheave or track portion 90 which aligns with a groove, sheave or track portion 92 on pulley portion 88 when the pulley portions are installed in the visor core 16. The pulley portions can be molded integrally with the visor core or as a cassette add-on feature to a standard core. Thus, the preferred design includes a recessed mirror 18, parallel door tracks 42, 44, a pair of split pulleys 86, 88 having semi-circular track portions 90, 92 which allow cable loop 82 to slide around the track.

It is desirable to provide some means to keep the cable loop from jumping out of its track. One way is to configure the groove 90, 92 on each split pulley in a manner to overhang or trap the cable in the groove. Another way is to install a cable slack adjustor in the form of a spring 94, 96 on each split pulley to bias the slack from the cable. The entire arrangement will be hidden within the visor core 16 or behind mirror 18.

The mirror doors 46, 48 and tracks 42, 44 are configured in a manner which allows the doors to mate to and be held captive by the door tracks while still permitting the doors to slide back and forth in the tracks. Each door will also have a cable attachment point. Door 46 has an attachment point 100 to one side of the cable loop 82 while door 48 has an attachment point 102 to the other side of the cable loop. The attachment of the doors to the cable loop may be a separate operation during assembly of the visor mirror. It is, however, within the design of this invention to mold one or both doors and the cable loop as a single molded unit as illustrated by FIG. 5.

Cable 82 could be a belt type continuous loop, or a "string" segment of material that attaches to the two mirror doors at locations 180° apart. The cable could be constructed out of any flexible material, with performance characteristics similar to nylon mono-filiment line. As aforesaid, the cable could be attached during assembly or integrally molded with the mirror doors. The cable could also be round, flat or segmented in its cross section.

In operation the visor mirror assembly would function in the following manner. With everything assembled and the mirror doors 46, 48 closed, sliding one of the doors (the driving door) to the open position causes cable 82 attached to that driving door to grow taut and pull the cable in the direction of the driving door. Because the cable is located in a pulley sheave groove such as 90, 92 that reverses the cable direction 180° and the opposite end of the cable is attached to the other door (the driven door), any force or movement exerted on one of the mirror doors is transferred equally to the other mirror door. As the driving door is moved laterally the cable slides around the cable track and pulls the driven door laterally in the opposite direction. Also since the cable is a continuous loop any movement of the driving door in the opposite direction causes both doors to move towards each other, thereby closing the mirror vanity. Throughout this operation, the means for intercoupling the doors is in concealably spaced relationship with the track and hidden within the hollow shell from the user of the mirror.

With reference to FIGS. 5 and 6, when the doors 46, 48 are in the closed position, it is desirable that the user not see the mirror through the crack. This possibility is minimized by incorporating a ramp 110 on door 46 and a ramp 112 on door 48. The track 42 is modified to incorporate a flexible detent 114 which cooperates with ramp 112 to bias door 48 in a closing direction. Track 44 is similarly modified with a detent (not shown) which cooperates with a detent 116 on door 46 to bias door 46 in a closing direction.

While the preferred embodiment and alternative embodiments of the invention have been described in detail, those familiar with the art to which this invention relates will recognize various alternative designs and embodiments for practicing the invention as defined by the following claims.

What is claimed is:

1. A visor mirror assembly for a vehicle comprising:
   a hollow shell having a mirror supported by a housing within the shell;
   said housing having a track adjacent the mirror and a pair of split pulley portions sufficiently outboard of said mirror and aligned to define a pathway around said mirror;
   a pair of opposed doors slidably mounted to said housing for movement in said track toward one another between a substantially abutting closed position for covering said mirror and away from one another toward an open position exposing said mirror for use, one of said doors having a first side adjacent said pathway on one side of said mirror and the other of said doors having second side adjacent said pathway on the opposite side of said mirror; and
   continuous flexible means extending around said pathway and said mirror in concealably spaced relationship with said track, said flexible means being fixed at one point with respect to said first side of said one of said doors and being fixed at another point with respect to said second side of said other of said doors for intercoupling said doors such that movement of said one door synchronously moves said other door in an opposite direction and through the same distance.

2. The visor mirror assembly of claim 1 wherein the continuous flexible means is a belt type continuous loop in said pathway, said loop extending sufficiently around said doors and at least one of said split pulley portions to connect the fixed points of said flexible means such that movement of said one door moves the fixed point of said one door in one direction while moving the fixed point of the other door in the opposite direction.

3. The visor mirror assembly of claim 2 wherein at least one of said pair of split pulley portions includes a loop tension spring to maintain the tension on said loop.

4. The visor mirror assembly of claim 1 wherein said track is molded integrally with said shell.

5. The visor mirror assembly of claim 2 wherein said split pulley portions define a groove configured to retain said loop in said pathway.

6. The visor mirror assembly of claim 1 wherein said continuous flexible means is integrally molded with at least one of said pair of doors.

7. The visor mirror assembly of claim 1 wherein said track is comprised of parallel track portions on opposite sides of said opposed doors.

8. The visor mirror assembly of claim 1 wherein said flexible means and said points fixed with respect to the respective sides of said doors are hidden within the hollow shell from the user of said mirror.

9. The visor mirror assembly of claim 1, including a ramp on one of said pair of doors and a detent on said track, said ramp and said detent cooperating to bias said one of said pair of doors into its abutting closed position with the other of said pair of doors.

10. A visor mirror assembly for a vehicle comprising:
    a hollow shell having a mirror supported by a housing within the shell;
    said housing having a track adjacent the mirror to define a pathway around said mirror;
    a pair of opposed doors slidably mounted to said housing for movement in said track toward one another between a substantially abutting closed position for covering said mirror and away from one another toward an open position exposing said mirror for use, one of said doors having a first side adjacent said pathway on one side of said mirror and the other of said doors having second side adjacent said pathway on the opposite side of said mirror; and continuous flexible means extending around said pathway and said mirror in concealably spaced relationship with said track, said flexible means being fixed at one point with respect to said first side of said one of said doors and being fixed at another point with respect to said second side of said other of said doors for intercoupling said doors such that movement of said one door synchronously moves said other door in an opposite direction and through the same distance.

* * * * *